Figure 2:
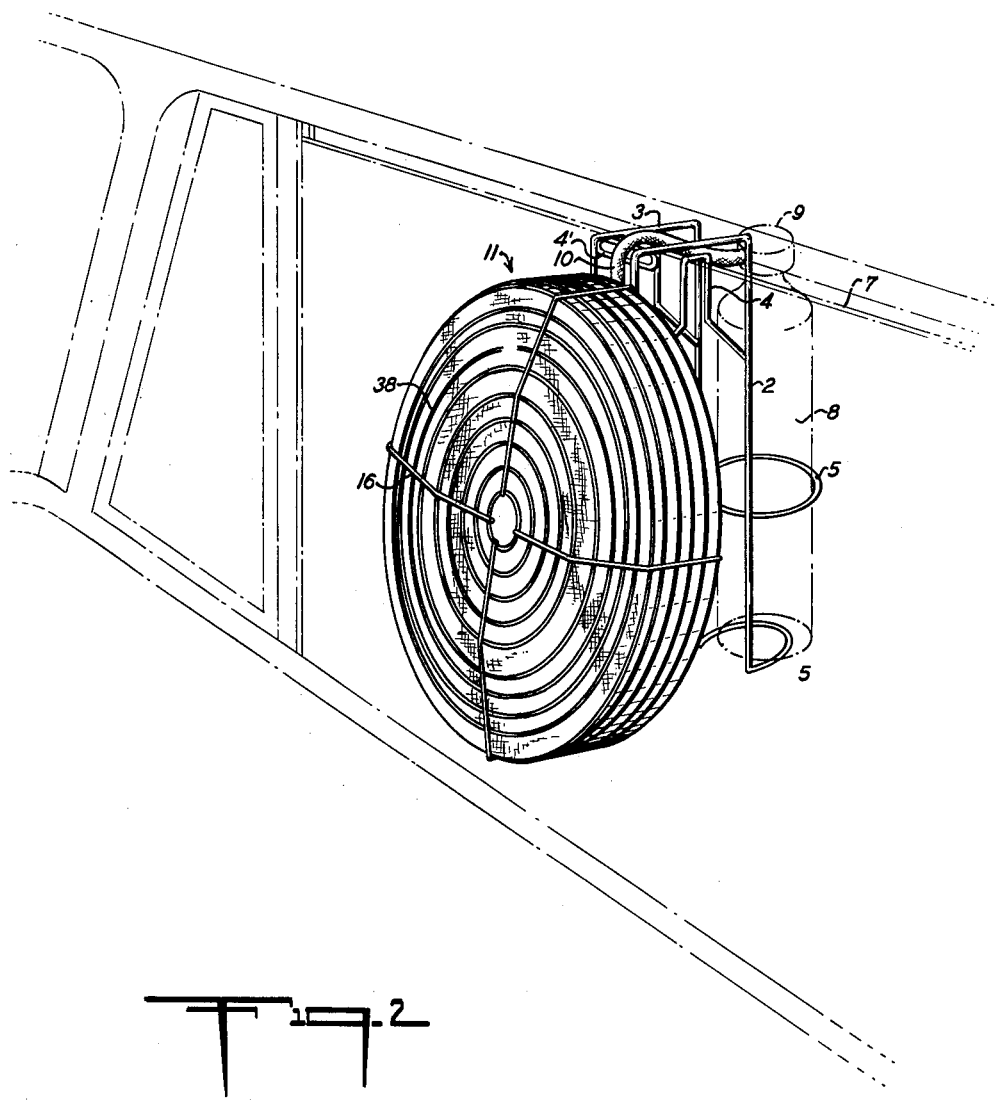

April 17, 1962     M. E. WEBSTER     3,029,802
AUTOMOBILE HEATER
Filed Oct. 15, 1958     3 Sheets-Sheet 1
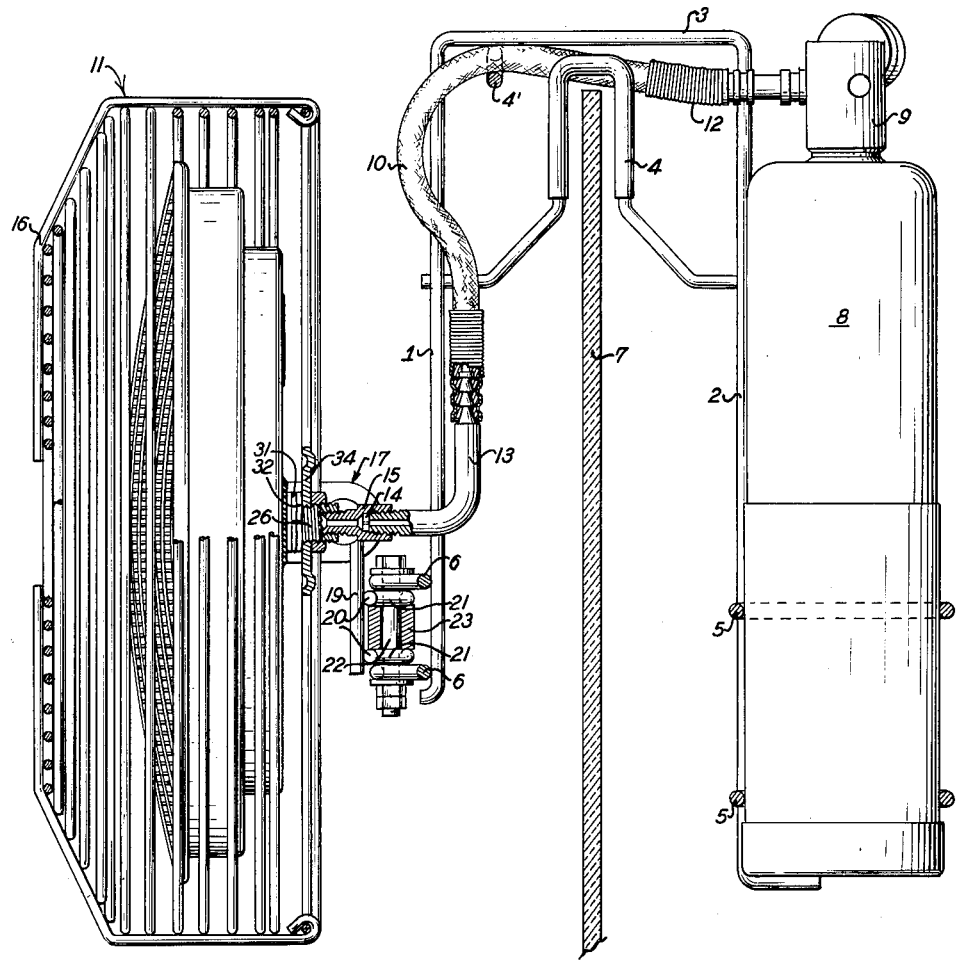
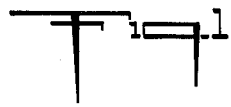
INVENTOR
MILO E. WEBSTER
BY
ATTORNEYS

INVENTOR
MILO E. WEBSTER

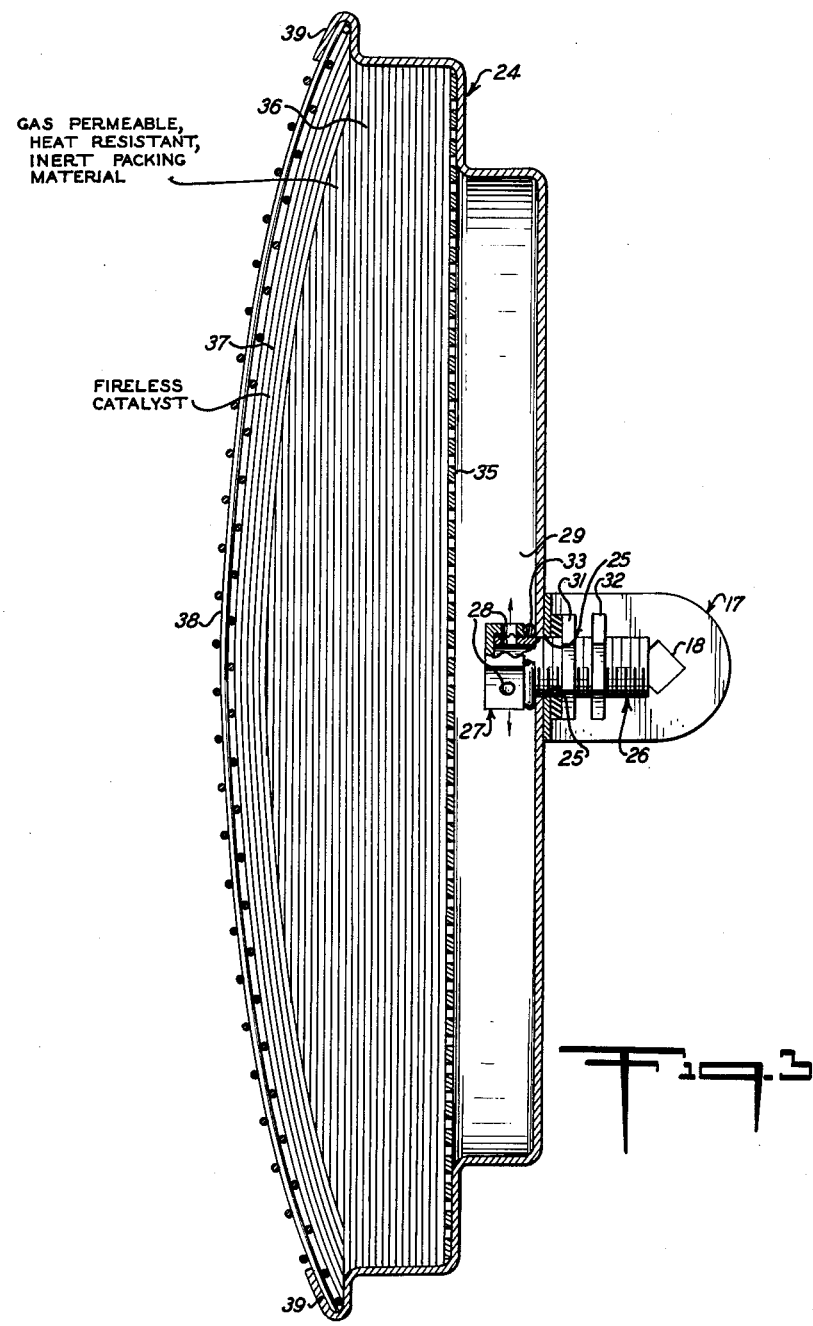

3,029,802
AUTOMOBILE HEATER
Milo E. Webster, Rochester, N.Y., assignor to Otto Bernz Company, Inc., Rochester, N.Y., a corporation of New York
Filed Oct. 15, 1958, Ser. No. 767,407
5 Claims. (Cl. 126—93)

This invention relates to a novel automobile heater. The invention more particularly relates to an automobile heater adapted to be attached to a side window of an automobile for use in a drive-in theater.

Theaters in which the audience view the motion picture from the seats of their own automobiles have become wide-spread and are generally referred to as drive-in theaters. These theaters are generally in the form of an outdoor arena having a multiple number of designated parking spots, facing toward a large motion picture screen. An individual speaker which may be placed inside an automobile is provided at each of these parking spots.

The drive-in theaters generally only remain open during the seasonal period when the weather is relatively mild as it would not be comfortable for the audience to sit in their automobiles during colder periods. The use of the ordinary automobile heaters is not practical nor feasible as the car's engine must be kept running to keep these heaters operating, and it is not practical, economical, nor for that matter safe to keep the car's engine running during the drive-in show.

Attempts have been made to increase the operating season of the drive-in theaters by providing electric heaters for the automobiles. The provision of such an arrangement for a drive-in theater is, however, an extremely expensive and extensive operation. Heavy-duty cables must be laid underground to all of the parking spots and individual heaters provided at these spots. Furthermore, expensive electrical connections must be made to meet the heavy load requirements of these heaters. In addition to the initial installation costs, which are often prohibitive, the cost of current, considering the high requirements for the short periods of use, is very high.

One object of this invention is an automobile heater for drive-in theaters which may be provided without the above-mentioned disadvantages. This and still further objects will become apparent from the following description given, in conjunction with the drawing, in which FIG. 1 is a side elevation partially in section of an embodiment of an automobile heater in accordance with the invention.

FIG. 2 is a perspective view showing the heater of FIG. 1 in place in an automobile, and FIG. 3 is a vertical section of the heater element of the heater shown in FIGS. 1 and 2.

The automobile heater, in accordance with the invention, preferably comprises a frame having two spaced apart downwardly extending sides connected together at their upper portion. A downwardly facing U-shaped hook is mounted between said sides at the upper portion thereof and adapted to be hooked over an automobile's side window with one side of the frame on one side of the window and the other side of the frame on the other side of the window, an LP cylinder is suspended on one side of the frame, and preferably positioned in a cradle, defined by the frame. A catalytic fireless gas heater is mounted on the other side of the frame and an LP hose connects the cylinder and heater. The hose is preferably connected to the cylinder through a tap connection for the cylinder which most preferably contains a pressure regulator.

Referring to the embodiment shown in the drawing, the frame has the downwardly extending side 1 and the spaced apart downwardly extending side 2. The sides 1 and 2 are connected together at their upper portion at 3. A downwardly facing U-shaped hook 4 is mounted between the sides 1 and 2 of the frame at the upper portion thereof just below the connection 3. The frame and the U-shaped hook are preferably made of a heavy gauge steel wire which is chrome plated, painted, or the like to rust proof the same and the parts are preferably joined together by spot welding. The frame is preferably made of two parallel, spaced apart sections, which are joined together by the bridge member 4', by the rings 5, and the braces 6. The two sections of the frame may best be seen in FIG. 2. The hook 4 is adapted to be hooked over an automobile's side window 7 with the side of the frame 1 on the inside thereof and the side of the frame 2 on the outside thereof. Hook 4 is preferably provided with a rubber coating or padding, or a combination of coating and padding, or other resilient material in order to protect the window.

The rings 5, together with the hooked over bottom portion of the frame side 2, define a cradle for the LP cylinder 8. The LP gas cylinder is preferably a steel LP gas cylinder of the I.C.C. type provided with a screw connection at its upper portion to which a tap connection may be connected. The cylinder is preferably provided with an LP gas, such as propane, and may, for example, be of the well known and widely marketed Bernz-O-Matic type of cylinder. The cylinder is removably connected to the tap connection 9 into which the cylinder is screwed. This tap connection is preferably provided with a pressure regulator, preferably of the type described in U.S. Patent Number 2,854,991, issued October 7, 1958. The tap connection, as described in this Patent, is provided with an elongated stem which extends into the outlet opening of the cylinder 8 when the tap connection is screwed in place, which depresses an ordinary tire core valve, normally closing the cylinder. In order to avoid tampering by the patrons of the drive-in theater, the normally provided manual shut off valve for the tap connection may be omitted so that as soon as the cylinder is screwed in place, the gas flow commences and is only interrupted by detaching the cylinder from the tap connection whereupon the tire valve will normally seal the same. A flexible LP hose 10 connects the tap connection to a catalytic fireless heater, generally designated at 11. The hose bends over and is supported by the bridge member 4'. The hose may be of any conventional construction capable of handling LP gas at the pressures encountered, but is preferably a heavy-walled synthetic rubber hose covered with a neoprene latex, impregnated with rayon braid and coated with liquid nylon. Furthermore, the exterior of the hose is preferably protected against abrasion by the closely wound wire cover 12. The hose 10 is pulled over a nipple provided at the end of rigid tubing, as for example of copper or brass, 13 which is provided with a gas spud 14 at its ends, the spud having a small central orifice for the passage of gas therethrough. The tube 13 is screwed into the connection 15 which leads to the gas distributing head of the catalytic fireless heater.

The catalytic fireless gas heater 11 is provided with a guard grille 16 to prevent direct contact with the face of the heater and is connected to the side 1 of the frame through a pivot connection which allows pivoting in both horizontal and vertical directions. A U-shaped bracket 17 is secured onto the rear of the heater, as for example by spot welding. The spaced apart lugs of the U bracket are each provided with a square opening 18 therethrough into which a carriage bolt is inserted. The looped end of a wire rod 19, provided with a loop or an eye at its end is threaded over each of the carriage bolts and secured in place by means of nuts and washers. The wire rods 19 are connected together by cross-member wire rods 20 and spot welded thereto. These cross-member wire rods 20 have central loops 21 which extend around a stud 22. The braces 6 are also looped around the stud 22 and the stud is secured to these braces by means of nuts. A spacer washer 23 is provided between the members 20. The fireless heater 11 may thus be pivoted horizontally by means of the loops 21, pivoting around the stud 22, friction holding the same in position set. The fireless heater may also pivot vertically around the eyes in the wires 19, friction also holding the same in the vertical position in which it is manually set.

The fireless heater may have any known or conventional construction of a gas type fireless heater and preferably has the construction as shown in FIG. 3.

As shown in FIG. 3, the heater consists of a sheet metal housing 24, of substantially circular cross section, enclosed at the rear and open at the front so that the same more or less gives the general appearance of a cake dish or pan.

A gas inlet opening 25 extends through the center of the back of the housing 24. An internally and externally threaded sleeve 26, as for example of brass, extends through this hole and terminates in the housing at the gas distributing head 27. This head is in the form of a hexnut which has a central bore which does not extend completely therethrough but which is in communication with the bore of the sleeve 26, and is provided on each of its faces with radially extending bores or outlets 28 in communication with the partial bore so that gas flowing through the interior of the sleeve 26 will flow out through the radial bores 28 into the space 29 of the housing and be substantially uniformly distributed in this space. The sleeve 26 also extends through a congruent hole in the base of the bracket 17 and is secured in place by means of the nuts 31 and 32. A gas-tight seal is effected by means of a packing ring 33. A bracket 34 (FIG. 1) which forms the support for the protective grille 16 is also screwed over the sleeve 26. The fitting 15 is screwed into the internally threaded bore of the sleeve 26, forming a gastight connection so that gas flowing through the hose 10 will flow through the sleeve and distributor head out of the bores 28 into the space 29.

The forward end of the space 29 is enclosed by the gas distributing disc 35, which is positioned in spaced relationship to the rear of the housing. This gas distributing disc may, for example, consist of an aluminum disc of, for example, .05" thick, having a multiple number of perforations closely distributed over its entire surface. These perforations may, for example, be round perforations ⅛" in diameter. Any other distributing means, however, may be used which will uniformly distribute the gas from the space 29. In front of the distributing disc 35, and filling the majority of the housing, is the gas permeable, heat-resistant, inert packing material 36. This packing material may consist of any inert heat resistant material, which will allow the passage and distribution of gas therethrough, as for example glass wool, asbestos wool, but is preferably basalt rock wool. In front of the packing material 36 and at the face of the heater is the fireless catalyst 37. This may constitute any known catalytic materials which are capable of oxidizing gas, such as propane in an exothermic reaction but without the evolution of a flame. This material, for long life, is preferably a platinum catalyst and may consist, for example, of small particles of platinum interdispersed in quartz wool.

In accordance with a preferred embodiment of the invention, the catalyst layer consists of a fabric such as an asbestic fabric which is impregnated with the catalyst. The asbestos fiber net, as for example, about 1/16" thick, may be impregnated with the catalyst in the form of a soluble salt, such as for example, with platinum chloride. Thereafter the platinum chloride may be converted to the corresponding oxide, as for example, by ignition and the oxide reduced to the metal, as for example, with hydrogen. In front of the catalyst layer and holding the material in place is the open mesh metal screen 38. This may, for example, consist of 6½ mesh wire screen of heat-resistant metal, as for example, stainless steel, nicrome or preferably steel with a porcelain coating. The screen is held in place by having the edges of the housing turned over the same at 39.

In operation the cylinder 8, as for example, when partially filled with propane, is screwed into the tap connection 9 and placed in the cradle formed by the frame side 2 and rings 5. The screwing of the cylinder into the tap connection 9 depresses the valve normally closing the cylinder so that gas flows through the tap connection and pressure regulator constituting part thereof and through the hose 10. The pressure regulator is, for example, set so that the gas may pass through the hose 10 at a pressure of about 15 pounds per square inch. From the hose 10 gas passes through the tube 13, spud 14, through the sleeve 26, to the gas distributing head 27, and out through the radial bores 28 into the space 29. From the space 29, gas passes through the openings in the gas distributing plate 35, permeates through the packing 36, uniformily in contact with the catalyst layer 37. The catalytic oxidation is initiated at at the catalyst layer 37 by preheating the same, as for example, with an ordinary blow torch or hand propane torch, or the like. After this preheating, to initiate the catalytic reaction, the gas is uniformly and efficiently oxidized by the air coming in at the face, at the catalytic layer causing the face of the heater to generate heat without flame. The temperature generated at the face of the heater is generally between about 160 and 170° F., and thus is completely adequate for its heating purpose without any fire danger.

In the drive-in theater, cylinders 8 can generally be refilled by the theater management. The refilling may be effected by weight, as for example, filling the same with about 12 ounces of propane, which should allow operation for more than five hours. A theater attendant then connects the cylinder 8 to the tap 9 and heats the face of the heater with an ordinary hand torch, as for example, with a propane torch. A heating period of about 15 seconds is generally adequate. Heaters which are lit in this manner are then laid out at a suitable place by which cars entering the drive-in theater must pass. The cars desiring heaters will pick up the same, as for example, for a small purchase price and deposit which is returned when the heaters are returned, or the like, and the attendant places the same in the car by hanging the same on the car's side window as shown in FIG. 2.

After the car is parked the occupants may adjust the direction of the heater by means of the swivel connection and the same will provide adequate heat for the car. Extensive tests have proven that there is no danger of fire or asphyxiation, or discomfort from the heaters.

After the drive-in feature, cars leaving the theater may turn heaters in to the attendant, receive back their deposit, or license, whichever was initially exchanged for the heater.

The heater is extremely fool-proof in operation and highly economical from an initial cost standpoint and from an operational standpoint. The gas required for heating a car during a feature is generally at a cost of not more than a few cents. No modification of the theater structure is required for the heater installation, and there is no extra power requirement, or requirement of laying cables or the like.

While the heater, as has been mentioned, is primarily intended for this purpose, the same may, of course, find other uses as an automobile or supplemental heater.

Although the invention has been described in detail with reference to the specific embodiments shown, various changes and modifications, which fall within the spirit of the invention and the scope of the appended claims, will become apparent to the skilled artisan. The invention, therefore, is only intended to be limited by the claims or their equivalents wherein I have endeavored to claim all inherent novelty.

I claim:

1. An automobile heater comprising a frame having two spaced apart downwardly extending sides connected together at their upper portions, a downwardly facing U-shaped hook mounted between said sides at the upper portion thereof and adapted to be hooked over an automobile side window with one side of said frame on one side of the window and the other side of said frame on the other side of the window, an LP gas cylinder suspended on one side of said frame, a catalytic fireless heater mounted on the other side of said frame, and an LP gas hose connecting said cylinder and heater.

2. A heater according to claim 1 in which the side of said frame on which said LP cylinder is suspended defines a cradle for the LP cylinder with the cylinder removably positioned therein, and in which said hose is a flexible hose connected to said cylinder through a tap connection.

3. A heater according to claim 2 in which said fireless catalytic heater is pivotally mounted on said frame.

4. A heater according to claim 3 including a guard grille surrounding said heater.

5. A heater according to claim 4 including a pressure regulator in said tap connection.

References Cited in the file of this patent

UNITED STATES PATENTS

| | | |
|---|---|---|
| 606,693 | Syssoyeff et al. | July 5, 1898 |
| 1,202,199 | Lumiere et al. | Oct. 24, 1916 |
| 1,345,323 | Frazer et al. | June 29, 1920 |
| 1,502,251 | Kanazawa | July 22, 1924 |
| 1,506,964 | Antrim | Sept. 2, 1924 |
| 1,935,489 | Von Mehren | Nov. 14, 1933 |
| 2,046,066 | Florman | June 30, 1936 |
| 2,352,485 | Kritzer | June 27, 1944 |
| 2,537,330 | Carroll | Jan. 9, 1951 |
| 2,538,492 | Anderson et al. | Jan. 16, 1951 |
| 2,832,331 | Schwank | Apr. 29, 1958 |
| 2,854,991 | Webster | Oct. 7, 1958 |
| 2,857,905 | Vanderbeek | Oct. 28, 1958 |

FOREIGN PATENTS

| | | |
|---|---|---|
| 65,192 | France | Sept. 28, 1955 |
| | (Addition to No. 1,083,586) | |
| 505,043 | Germany | Aug. 12, 1930 |
| 751,406 | Great Britain | June 27, 1956 |
| 802,525 | Great Britain | Oct. 8, 1958 |
| 522,763 | Italy | Apr. 12, 1955 |